(12) United States Patent
Gotoda

(10) Patent No.: US 10,604,146 B2
(45) Date of Patent: Mar. 31, 2020

(54) CONTROL APPARATUS FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Kenji Gotoda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 15/795,661

(22) Filed: Oct. 27, 2017

(65) Prior Publication Data

US 2018/0134278 A1 May 17, 2018

(30) Foreign Application Priority Data

Nov. 17, 2016 (JP) ................. 2016-224547

(51) Int. Cl.
*B60W 20/40* (2016.01)
*B60K 6/20* (2007.10)
(Continued)

(52) U.S. Cl.
CPC ............. *B60W 20/40* (2013.01); *B60K 6/20* (2013.01); *B60K 6/387* (2013.01); *B60K 6/445* (2013.01);
(Continued)

(58) Field of Classification Search
CPC ..... B60R 22/3413; B60R 22/36; E05B 79/08; E05B 81/76; E05B 83/40; E05B 81/06; E05B 53/003; E05B 83/247; E05B 65/5246; E05B 63/22; E05B 83/16; E05B 83/18; B62D 5/008; B62D 5/0463; B62D 15/025; B62D 6/002; B62D 6/06; B62D 5/0472; B62D 61/12; B62D 37/00; B62D 37/06; B25J 5/007; B25J 9/08; B60K 35/00; B60K 23/0808; B60K 6/20; B60K 6/387;
(Continued)

(56) References Cited

U.S. PATENT DOCUMENTS 8,857,272 B2 10/2014 Goetting
2012/0010798 A1* 1/2012 Ito ................... B60K 23/0808
701/70

(Continued)

FOREIGN PATENT DOCUMENTS

JP 2013-539530 A 10/2013
JP 2016-107673 A 6/2016
JP 2016-182841 A 10/2016

*Primary Examiner* — Behrang Badii
(74) *Attorney, Agent, or Firm* — Oliff PLC

(57) ABSTRACT

A control apparatus for a vehicle is provided. The vehicle includes an engine, a first electric motor, a rotary member, and a rotation lock mechanism. The rotary member is provided between the engine and the first electric motor. The rotation lock mechanism is configured to prevent a coupling portion of the rotary member on the engine side from rotating in at least one direction. The control apparatus includes an electronic control unit. The electronic control unit is configured to learn characteristic associated with an input torque of the rotary member by applying a torque to the rotary member by the first electric motor and measuring a twist angle of the rotary member, with the rotation lock mechanism preventing the coupling portion from rotating.

6 Claims, 6 Drawing Sheets

(51) Int. Cl.
| | |
|---|---|
| *B60W 20/50* | (2016.01) |
| *B60W 20/00* | (2016.01) |
| *B60K 6/387* | (2007.10) |
| *B60W 20/15* | (2016.01) |
| *B60W 10/00* | (2006.01) |
| *B60K 6/445* | (2007.10) |
| *B60W 30/18* | (2012.01) |
| *B60W 30/20* | (2006.01) |
| *B60L 15/20* | (2006.01) |
| *B60L 50/16* | (2019.01) |
| *B60K 6/46* | (2007.10) |
| *B60W 10/02* | (2006.01) |
| *B60W 10/06* | (2006.01) |
| *B60W 10/08* | (2006.01) |
| *B60W 10/16* | (2012.01) |
| *B60W 10/18* | (2012.01) |
| *B60W 20/10* | (2016.01) |
| *B60K 6/38* | (2007.10) |
| *B60W 50/00* | (2006.01) |
| *B60K 6/365* | (2007.10) |
| *B60K 6/383* | (2007.10) |

(52) U.S. Cl.
CPC ............... *B60K 6/46* (2013.01); *B60L 15/20* (2013.01); *B60L 50/16* (2019.02); *B60W 10/00* (2013.01); *B60W 10/026* (2013.01); *B60W 10/06* (2013.01); *B60W 10/08* (2013.01); *B60W 10/16* (2013.01); *B60W 10/18* (2013.01); *B60W 20/00* (2013.01); *B60W 20/10* (2013.01); *B60W 20/15* (2016.01); *B60W 20/50* (2013.01); *B60W 30/18054* (2013.01); *B60W 30/20* (2013.01); *B60K 6/365* (2013.01); *B60K 6/383* (2013.01); *B60K 2006/381* (2013.01); *B60W 2050/0088* (2013.01); *B60W 2510/0275* (2013.01); *B60W 2710/0666* (2013.01); *B60W 2710/083* (2013.01); *B60W 2710/18* (2013.01); *Y02T 10/6239* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/91* (2013.01); *Y10S 903/913* (2013.01); *Y10S 903/93* (2013.01)

(58) Field of Classification Search
CPC .......... B60K 6/445; B60K 6/46; B63H 16/04; B63H 16/06; B60J 7/198; B60J 7/1621; B61C 17/06; B60N 2/3011; B60N 2/3013; B60N 2/305; B60N 2/3075; B60N 2/859; B60N 2/844; B60W 20/40; B60W 10/184; B60W 30/18145; B60W 20/15; E05F 15/643; B60L 15/20; B60L 50/16; G02B 27/0101; G02B 27/0149; E05C 9/08; E05C 19/06; E05C 9/1808; B65D 43/22; B65D 43/16; B60T 8/1769; B61F 5/22; G01C 19/02; G01C 19/065; B25H 3/02
See application file for complete search history.

(56) References Cited

U.S. PATENT DOCUMENTS

| | | | |
|---|---|---|---|
| 2013/0074609 A1 | 3/2013 | Goetting | |
| 2013/0164105 A1* | 6/2013 | Scherf | B60P 1/483 414/547 |
| 2013/0234488 A1* | 9/2013 | Pleskot | B60N 2/22 297/354.12 |
| 2014/0054920 A1* | 2/2014 | Jeffries | B60J 7/198 296/100.07 |
| 2014/0271194 A1* | 9/2014 | Van Gompel | B63H 16/04 416/74 |
| 2015/0103408 A1* | 4/2015 | Nishima | B60K 35/00 359/618 |
| 2015/0210329 A1* | 7/2015 | Hutcheson | B25J 5/007 180/209 |
| 2015/0321661 A1 | 11/2015 | Hayashi et al. | |
| 2017/0036692 A1* | 2/2017 | Kojo | B62D 5/008 |
| 2017/0067273 A1* | 3/2017 | Yamashita | E05B 79/08 |
| 2017/0129453 A1* | 5/2017 | Suga | B60R 22/3413 |

* cited by examiner

CONTROL APPARATUS FOR VEHICLE AND CONTROL METHOD FOR VEHICLE

BACKGROUND

1. Technical Field

The disclosure relates to a control apparatus for a vehicle and a control method for the vehicle.

2. Description of Related Art

There is known a vehicle that is equipped with an engine, an electric motor, and a rotary member that is provided between the engine and the electric motor and that has characteristic associated with an input torque. It should be noted herein that the rotary member is, for example, a damper device that absorbs rotational vibrations of the engine, a power transmission shaft having a predetermined rigidity, or the like. The characteristics of the rotary member include a rigidity corresponding to a change in a twist angle with respect to a change in an input torque, a hysteresis as a difference between the input torque at the time when the twist angle increases and the input torque at the time when the twist angle decreases, a backlash dimension as an amount of change in the twist angle at the time when the sign of the input torque is reversed, and the like. By the way, the characteristic of the rotary member may influence power performance, vibration properties, noise properties and the like. It is therefore conceivable to take measures both hardware-wise and software-wise, so as to improve power performance, vibration properties, noise properties and the like based on the characteristic. For example, Japanese Patent Application Publication No. 2016-107673 (JP 2016-107673 A) proposes an art for changing the torque of an electric motor in such a manner as to change a rigidity value of a damper device based on a relationship between an input torque of the damper device and the rigidity value of the damper device when a vehicle runs using the electric motor as a driving force source. Thus, the vehicle is prevented from resonating as a result of the rigidity of the damper device.

SUMMARY

However, if the characteristic varies due to the individual difference or the like of the rotary member, the control based on characteristic determined in advance may not bring a desired result.

The disclosure provides a control apparatus for a vehicle and a control method for the vehicle that ensure that the control based on characteristic of a rotary member is appropriately performed regardless of the variation of the characteristic due to the individual difference or the like of the rotary member.

A first aspect of the disclosure is a control apparatus for a vehicle. The vehicle includes an engine, a first electric motor, a rotary member, and a rotation lock mechanism. The rotary member is provided between the engine and the first electric motor. The rotary member has characteristic associated with an input torque. The rotation lock mechanism is configured to prevent a coupling portion of the rotary member on the engine side from rotating in at least one direction. The control apparatus includes an electronic control unit. The electronic control unit is configured to learn characteristic of the rotary member by applying a torque to the rotary member by the first electric motor and measuring a twist angle of the rotary member, with the rotation lock mechanism preventing the coupling portion from rotating. The electronic control unit is configured to perform predetermined control based on the learned characteristic of the rotary member.

In the control apparatus, the vehicle may be further include a second electric motor that is configured to be utilized as a driving force source. A driving force of the vehicle may be generated due to a reaction force resulting from the rotation lock mechanism, when the first electric motor applies the torque to the rotary member, with the rotation lock mechanism preventing the coupling portion from rotating. The electronic control unit may be configured to control a torque of the second electric motor in such a manner as to counterbalance the driving force that is generated by the reaction force, when the torque is applied to the rotary member by the first electric motor to learn the characteristic.

With this configuration, the torque of the second electric motor is controlled in such a manner as to counterbalance the driving force that is generated in applying the torque to the rotary member by the electric motor so as to learn the characteristic of the rotary member. Therefore, the characteristic of the rotary member can be learned while restraining a passenger from developing a feeling of strangeness due to fluctuations in the driving force.

In the control apparatus, the rotary member may be a damper device.

In the control apparatus, the vehicle may further include a driving wheel and a differential mechanism. The differential mechanism may be configured to distribute an output of the engine to the first electric motor side and the driving wheel side. The damper device may be provided between the engine and the differential mechanism. When a torque is applied to the damper device via the differential mechanism by the first electric motor with the rotation lock mechanism preventing the coupling portion from rotating, a reaction force resulting from the rotation lock mechanism may be transmitted to the driving wheel side via the differential mechanism, and the electronic control unit may be configured to use the first electric motor as a driving force source.

With this configuration, the rotary member is the damper device. The damper device has characteristic such as a rigidity corresponding to a change in the twist angle with respect to a change in the input torque, a hysteresis as a difference between the input torque at the time when the twist angle increases and the input torque at the time when the twist angle decreases, a backlash dimension as an amount of change in the twist angle at the time when the sign of the input torque is reversed, and the like. When the vehicle runs with a torque applied to the damper device, when the engine is started and stopped, or when an engine brake is operated etc., the characteristic may influence power performance, vibration properties, noise properties and the like. The control for improving power performance, vibration properties, noise properties and the like can be performed based on those characteristic. In this case, the electronic control unit learns the characteristic, so the control thereof is appropriately performed based on actual characteristic regardless of the variation of the characteristic resulting from the individual difference or the like of the damper device.

In the control apparatus, the characteristic may be characteristic regarding a rigidity corresponding to a change in the twist angle with respect to a change in the input torque of the damper device. The characteristic may be equipped with a plurality of input torque ranges with different rigidity values. The electronic control unit may be configured to control a torque of the first electric motor such that a rigidity value at which the vehicle is restrained from resonating is obtained, based on a relationship between the rigidity values and the input torque, when the vehicle runs using the first electric motor as a driving force source, with the coupling portion prevented from rotating by the rotation lock mechanism.

In this control apparatus for the vehicle, the characteristic of the rotary member are learned by applying the torque to the rotary member by the electric motor and measuring the twist angle of the rotary member, and predetermined control is performed based on the learned characteristic, with the coupling portion of the rotary member on the engine side prevented from rotating by the rotation lock mechanism. Therefore, predetermined control can be appropriately performed based on the actual characteristic, regardless of the variation of the characteristic resulting from the individual difference or the like of the rotary member.

With this configuration, when the rigidity value of the damper device has different values in a plurality of input torque ranges and the torque of the electric motor is controlled based on the characteristic regarding the rigidity such that the vehicle is restrained from resonating, the characteristic regarding the rigidity are learned by a characteristic learning unit. Thus, the torque of the electric motor is controlled based on the accurate characteristic regardless of the individual difference or the like of the damper device, and resonance can be appropriately suppressed.

A second aspect of the disclosure is a control method for a vehicle. The vehicle includes an engine, a first electric motor, a rotary member, a rotation lock mechanism, and an electronic control unit. The rotary member is provided between the engine and the first electric motor. The rotary member has characteristic associated with an input torque. The rotation lock mechanism is configured to prevent a coupling portion of the rotary member on the engine side from rotating in at least one direction. The control method includes: learning, by the electronic control unit, the characteristic of the rotary member by applying a torque to the rotary member by the first electric motor and thus measuring a twist angle of the rotary member by the electronic control unit, with the rotation lock mechanism preventing the coupling portion from rotating; and performing, by the electronic control unit, predetermined control based on the learned characteristic of the rotary member.

BRIEF DESCRIPTION OF THE DRAWINGS

Features, advantages, and technical and industrial significance of an exemplary embodiment will be described below with reference to the accompanying drawings, in which like numerals denote like elements, and wherein.

DETAILED DESCRIPTION OF EMBODIMENT

Figure 1:
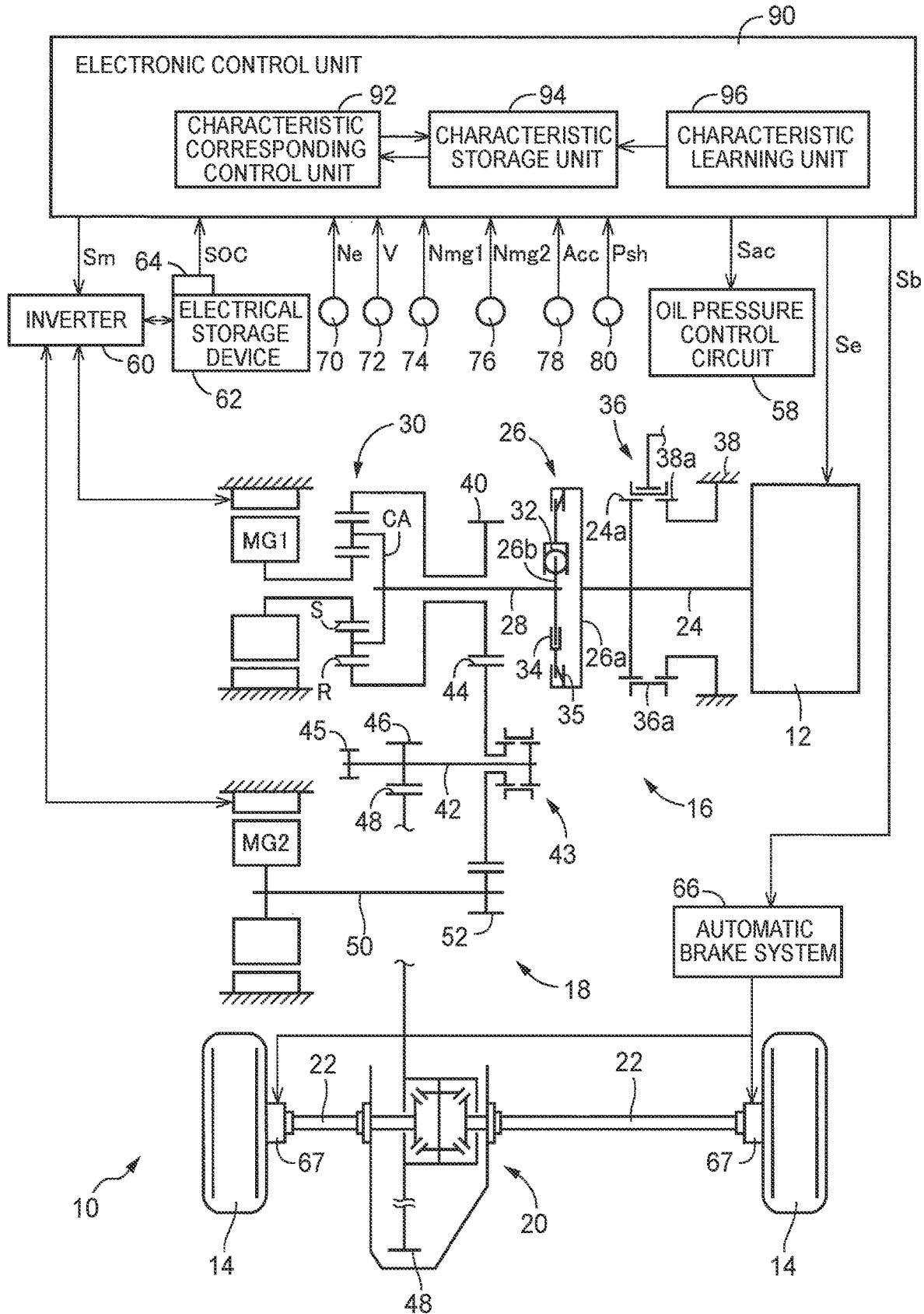
FIG. 1 is a skeleton diagram illustrating a drive system of a hybrid vehicle to which the disclosure is applied, and is a view showing the drive system of the hybrid vehicle in conjunction with an essential part of a control system.

An engine of a vehicle to which the disclosure is applied is an internal combustion engine that generates power through the combustion of fuel, such as a gasoline engine, a diesel engine or the like. A motor-generator, which can also be used as a generator, is preferably used as an electric motor. A rotary member having characteristic for an input torque is, for example, a damper device that absorbs rotational vibrations of the engine, a power transmission shaft having a predetermined rigidity, or the like. The characteristics of the rotary member for the input torque include a rigidity corresponding to a change in a twist angle with respect to a change in the input torque, a hysteresis as a difference between the input torque at the time when the twist angle increases and the input torque at the time when the twist angle decreases, a backlash dimension as an amount of change in the twist angle at the time when the sign of the input torque is reversed, and the like. The disclosure is applied to a case where predetermined control for improving power performance, vibration properties, noise properties and the like is performed based on one of the characteristics.

A friction brake or mesh-type brake of a hydraulic type or the like, a one-way clutch, or the like is preferably used as a rotation lock mechanism that prevents a coupling portion of the rotary member on the engine side from rotating in at least one direction. In the case of the one-way clutch, the one-way clutch is provided such that the engine is prevented from rotating in, for example, a reverse rotational direction. In the case where the transmission of power between the engine and the rotary member is suspended by a clutch or the like, it is sufficient to be able to prevent the engine from rotating in any one direction. An electronic control unit that learns the characteristic of the rotary member is desired to learn the characteristic, for example, during stop of the vehicle when the engine is stopped and the vehicle speed is equal to 0. The electronic control unit can also learn the characteristic at the time of motor running in which the vehicle runs using a second electric motor as a driving force source with the engine stopped. Besides, the characteristic can be learned at various timings. For instance, the characteristic may be learned when the vehicle is inspected, or the characteristic may be periodically learned based on a predetermined running distance or a predetermined running time. In the case where aging has a great influence, the characteristic is desired to be periodically learned under a certain condition.

When a driving force is generated in performing the aforementioned learning control, it is desirable to counterbalance the driving force by controlling the torque of the second electric motor. In the case where the characteristic is learned during stop of the vehicle, the characteristic may be learned on the condition, for example, that a brake is operated to be depressed, that the shift lever is operated to a parking (P) position to mesh a parking gear, that a parking brake is in operation, or the like. In the case where the vehicle is equipped with an automatic brake system capable of automatically controlling braking forces of wheel brakes, the wheel brakes may be operated. In the case where the fluctuations in the driving force including learning control during the running of the vehicle are small or where the characteristic is learned before shipment or at the time of the inspection of the vehicle, counterbalancing control may be omitted. Besides, counterbalancing control is not absolutely required to completely eliminate fluctuations in the driving force, but has only to reduce fluctuations in the driving force.

The disclosure is applied to, for example, a vehicle having a differential mechanism that distributes an output of the engine to the electric motor side and a driving wheel side. The disclosure is applicable to various vehicles, such as a vehicle in which an engine and an electric motor are connected in series to each other across a rotary member such as a damper device or the like, a vehicle in which outputs of an engine and an electric motor are synthesized by a planetary gear device or the like and transmitted to a driving wheel side, and the like. If necessary, a disconnection/connection device such as a clutch or the like, a shift gear, and the like may be provided between the engine and the rotary member or between the rotary member and the electric motor. In the case where the engine and the rotary member are directly coupled to each other via a coupling shaft or the like, rotation in at least one direction that is prevented by the rotation lock mechanism is determined such that reverse rotation of the engine is prevented, and the characteristic learning unit applies a torque in the reverse rotational direction to the rotary member. However, in the case where the disconnection/connection device is provided between the engine and the rotary member, the direction in which the engine is prevented from rotating is not limited in particular. Besides, in the case where rotation in both the directions is prevented by the rotation lock mechanism, the direction of the torque that is applied to the rotary member when the characteristic learning unit learns the characteristic is not necessarily limited. The characteristic can also be obtained by changing the torque in both positive and negative directions.

The embodiment of the disclosure will be described hereinafter in detail with reference to the drawings. FIG. 1 is a skeleton diagram illustrating a drive system of a hybrid vehicle 10 to which the disclosure is applied, and is a view showing the drive system of the hybrid vehicle 10 in conjunction with an essential part of a control system. The hybrid vehicle 10 has a transversely mounted drive system, for example, a front-engine front-drive (FF) drive system or the like, and is configured to be equipped with a first drive unit 16, a second drive unit 18, a final speed reduction device 20, a pair of right and left axles 22, and the like in a power transmission path between an engine 12 and a pair of right and left driving wheels 14. The engine 12 is an internal combustion engine such as a gasoline engine, a diesel engine or the like. A damper device 26 that absorbs torque fluctuations is connected to a crankshaft 24 of the engine 12. The damper device 26 is equipped with a first rotary element 26a that is coupled to the crankshaft 24, and a second rotary element 26b that is coupled to a differential mechanism 30 via an input shaft 28. A plurality of kinds of springs 32 and friction mechanisms 34 are interposed between the first rotary element 26a and the second rotary element 26b. In the damper device 26, a rigidity value (a spring constant) that corresponds to a change in a twist angle Φ with respect to a change in an input torque Tin is gradually changed, and a predetermined hysteresis is applied when the twist angle Φ increases/decreases. Besides, a torque limiter 35 is provided at an outer peripheral end portion of the damper device 26. This damper device 26 is an example of a rotary member having characteristic associated with the input torque Tin.

The first rotary element 26a is an example of a coupling portion on the engine 12 side.

The crankshaft 24, which is integrally coupled to the first rotary element 26a, is coupled to a housing 38 via a mesh-type brake 36, and is prevented from rotating. The mesh-type brake 36 includes meshing teeth 24a that are provided on the crankshaft 24, meshing teeth 38a that are provided on the housing 38, and a meshing sleeve 36a having an inner peripheral surface on which meshing teeth that can mesh with both the meshing teeth 24a, 38a are provided. The meshing sleeve 36a is moved in an axial direction, so the crankshaft 24 is relatively unrotatably engaged with the housing 38 or released from the housing 38 to be rotatable. For example, an electromagnetic changeover valve or the like that is provided in an oil pressure control circuit 58 is changed over in accordance with an oil pressure control signal Sac that is supplied from an electronic control unit 90, so the meshing sleeve 36a is moved in the axial direction via a hydraulic cylinder or the like to engage/release the mesh-type brake 36. The meshing sleeve 36a can also be moved in the axial direction through the use of other drive devices such as an electric feed screw mechanism and the like. If necessary, this mesh-type brake 36 is provided with a synchronization mechanism of a cone type or the like. The mesh-type brake 36 is an example of a rotation lock mechanism. Instead of the mesh-type brake 36, a one-way clutch or fiction brake that prevents the engine 12 from rotating only in a reverse direction can also be adopted as the rotation lock mechanism. An engine disconnecting/connecting clutch that can establish/suspend the transmission of power can also be provided between the engine 12 and the meshing teeth 24a.

The first drive unit 16 is configured to include a first motor-generator MG1 and an output gear 40 as well as the aforementioned engine 12, the aforementioned differential mechanism 30, and the aforementioned mesh-type brake 36. The differential mechanism 30 is a single pinion-type planetary gear device, and is equipped with three rotary elements, namely, a sun gear S, a ring gear R, and a carrier CA in such a manner as to enable differential rotation. The first motor-generator MG1 is coupled to the sun gear S, the input shaft 28 is coupled to the carrier CA, and the output gear 40 is coupled to the ring gear R. Accordingly, a torque transmitted to the carrier CA of the differential mechanism 30 from the engine 12 via the damper device 26 is distributed to the first motor-generator MG1 and the output gear 40 by the differential mechanism 30. When a rotational speed of the first motor-generator MG1 (an MG1 rotational speed) Nmg1 is controlled through regeneration control or the like, a rotational speed (an engine rotational speed) Ne of the engine 12 is changed in a non-step manner, and is output from the output gear 40. That is, this differential mechanism 30 and this first motor-generator MG1 function as electric continuously variable transmissions. The first motor-generator MG1 selectively functions as an electric motor or a generator, and is connected to an electrical storage device 62 via an inverter 60.

On the other hand, when the first motor-generator MG1 is rotationally driven in a negative rotational direction, which is the opposite of a rotational direction of the engine 12, with the crankshaft 24 prevented from rotating by the mesh-type brake 36, namely, with the carrier CA prevented from rotating via the damper device 26, a torque in a positive rotational direction (a vehicle forward direction), which is the same as the rotational direction of the engine 12, is applied to the output gear 40 due to a reaction force generated by the mesh-type brake 36, and the output gear 40 is rotationally driven in the positive rotational direction. When the first motor-generator MG1 is rotationally driven in the positive rotational direction, which is the same as the rotational direction of the engine 12, a torque in a reverse rotational direction (a vehicle backward direction), which is the opposite of the rotational direction of the engine 12, is applied to the output gear 40 due to the reaction force generated by the mesh-type brake 36, and the output gear 40 is rotationally driven in the reverse rotational direction. In this case, the torque of the first motor-generator MG1 is amplified in accordance with a gear ratio $\rho$ of the differential mechanism 30, and is applied to the damper device 26 that is coupled to the carrier CA. The first motor-generator MG1 is an electric motor that can apply a torque to the damper device 26 via the differential mechanism 30.

Figure 2:
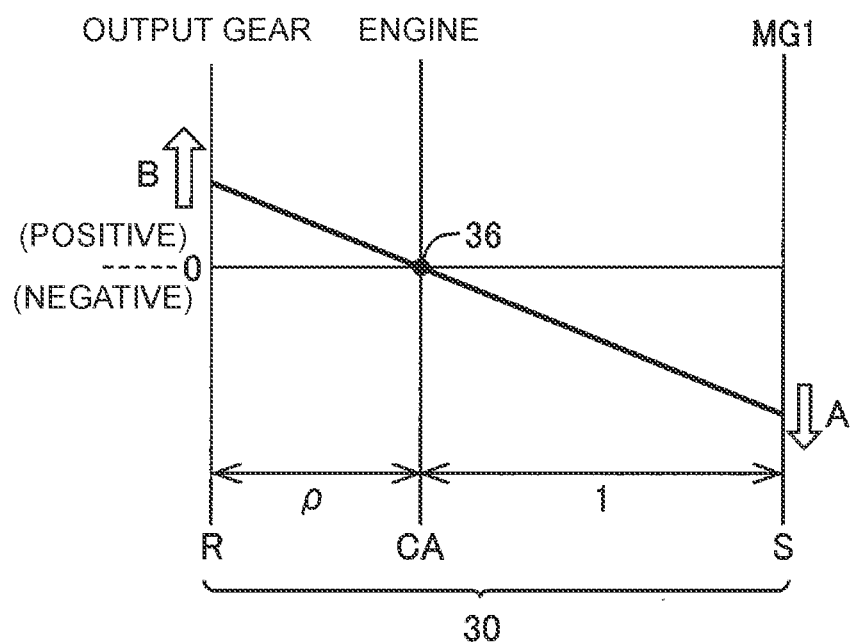
FIG. 2 is an alignment chart of a differential mechanism of the hybrid vehicle of FIG. 1.

FIG. 2 is an alignment chart in which rotational speeds of the three rotary elements of the differential mechanism 30, namely, the sun gear S, the ring gear R, and the carrier C can be linked with one another by a straight line. An upward direction in the drawing is the rotational direction of the engine 12, namely, the positive rotational direction. The intervals among axes of ordinate are determined in accordance with the gear ratio $\rho$ (=the number of teeth of the sun gear S/the number of teeth of the ring gear R) of the differential mechanism 30. Then, for example, a case where the output gear 40 is rotationally driven in the vehicle forward direction by the first motor-generator MG1 will be described. A torque rotating in the negative rotational direction (a downward direction in the drawing), which is the opposite of the rotational direction of the engine 12, is applied to the sun gear S as indicated by an arrow A through power running control of the first motor-generator MG1, with the carrier CA prevented from rotating by the mesh-type brake 36. Then, when the sun gear S is rotationally driven in the negative rotational direction thereof, a torque rotating in the positive rotational direction (an upward direction in the drawing), which is the same as the rotational direction of the engine 12, is transmitted to the ring gear R to which the output gear 40 is coupled, as indicated by an arrow B. As a result, a driving force in the forward direction is obtained.

The output gear 40 is meshed with a large-diameter gear 44 that is disposed on an intermediate shaft 42 parallel to the input shaft 28. A mesh-type clutch 43 is provided between the large-diameter gear 44 and the intermediate shaft 42, and the transmission of power therebetween is established/suspended. This mesh-type clutch 43 is configured in the same manner as the mesh-type brake 36. Another electromagnetic changeover valve or the like that is provided in the oil pressure control circuit 58 is changed over in accordance with the oil pressure control signal Sac that is supplied from the electronic control unit 90. Thus, a changeover between an engaged state and a released state is made via a hydraulic cylinder or the like, and the transmission of power between the large-diameter gear 44 and the intermediate shaft 42 is established/suspended. A small-diameter gear 46 that is smaller in diameter than the large-diameter gear 44 is provided on the intermediate shaft 42. The small-diameter gear 46 is meshed with a differential ring gear 48 of the final speed reduction device 20. Accordingly, rotation of the output gear 40 is reduced in speed in accordance with the ratio between the number of teeth of the output gear 40 and the number of teeth of the large-diameter gear 44, and the ratio between the number of teeth of the small-diameter gear 46 and the number of teeth of the differential ring gear 48, and is transmitted to the final speed reduction device 20. Furthermore, this rotation of the output gear 40 is transmitted to the driving wheels 14 from the pair of the axles 22 via the differential gear mechanism of the final speed reduction device 20. Besides, a parking gear 45 is relatively unrotatably provided on the aforementioned intermediate shaft 42. When a parking range is selected through the operation of the shift lever to the P position for parking or the like, a parking lock pawl (not shown) is pressed against and meshed with the parking gear 45 in accordance with an urging force of a spring or the like. As a result, the respective members are prevented from rotating from the intermediate shaft 42 toward the driving wheels 14.

The second drive unit 18 is configured to be equipped with a second motor-generator MG2, and a motor output gear 52 that is provided on a motor shaft 50 of the second motor-generator MG2. The motor output gear 52 is meshed with the large-diameter gear 44. Accordingly, rotation of the second motor-generator MG2 (an MG2 rotational speed Nmg2) is reduced in speed in accordance with the ratio between the number of teeth of the motor output gear 52 and the number of teeth of the large-diameter gear 44, and the ratio between the number of teeth of the small-diameter gear 46 and the number of teeth of the differential ring gear 48, and rotationally drives the driving wheels 14 via the pair of the axles 22. This second motor-generator MG2 selectively functions as an electric motor or a generator, and is connected to the electrical storage device 62 via the inverter 60. The second motor-generator MG2 is equivalent to a second electric motor that can be utilized as a driving force source.

The hybrid vehicle 10 is also equipped with an automatic brake system 66. The automatic brake system 66 electrically controls braking forces, namely, brake oil pressures of respective wheel brakes 67 that are provided in the driving wheels 14 and driven wheels (non-driving wheels) (not shown), in accordance with a brake control signal Sb that is supplied from the electronic control unit 90. Besides, a brake oil pressure is supplied to each of the wheel brakes 67 via a brake master cylinder through the operation of depressing a brake pedal (not shown). Each of the wheel brakes 67 mechanically generates the brake oil pressure, namely, a braking force corresponding to a brake operating force.

The hybrid vehicle 10 having the drive system configured as described above is equipped with the electronic control unit 90 as a controller that performs various kinds of control such as output control of the engine 12, torque control of the motor-generators MG1 and MG2, engagement/release control of the mesh-type brake 36 and the mesh-type clutch 43, automatic brake control by the automatic brake system 66, and the like. The electronic control unit 90 is configured to be equipped with a so-called microcomputer having a CPU, a RAM, a ROM, an input/output interface and the like, and performs the various kinds of control by carrying out a signal process in accordance with a program that is stored in advance in the ROM, while utilizing a temporary storage function of the RAM. Signals indicating various pieces of information needed for control such as an engine rotational speed Ne, a vehicle speed V, the MG1 rotational speed Nmg1, the MG2 rotational speed Nmg2, an accelerator operation amount Acc, a remaining electrical storage amount SOC of the electrical storage device 62, an operation position Psh of the shift lever and the like are supplied to the electronic control unit 90 from, for example, an engine rotational speed sensor 70, a vehicle speed sensor 72, an MG1 rotational speed sensor 74, an MG2 rotational speed sensor 76, an accelerator operation amount sensor 78, a shift position sensor 80, an SOC sensor 64 and the like respectively. A D position for forward running, an R position for backward running, the P position for parking, an N position for neutral and the like are available as the operation position Psh of the shift lever. When the parking range is selected through the operation to the P position, the parking lock pawl is meshed with the parking gear 45 that is provided on the intermediate shaft 42, so the parking gear 45 is mechanically prevented from rotating. Besides, an engine control signal Se for controlling an engine output, a motor control signal Sm for controlling torques (a power running torque and a regenerative torque) of the motor-generators MG1 and MG2, the oil pressure control signal Sac for changing over the engagement and release of the mesh-type brake 36 and the mesh-type clutch 43 via the electromagnetic changeover valve and the like of the oil pressure control circuit 58, the brake control signal Sb for controlling the braking forces of the wheel brakes 67 via the automatic brake system 66, and the like are output from the electronic control unit 90 via, for example, an electronic throttle valve, a fuel injection device, an ignition device and the like of the engine 12.

Figure 3:
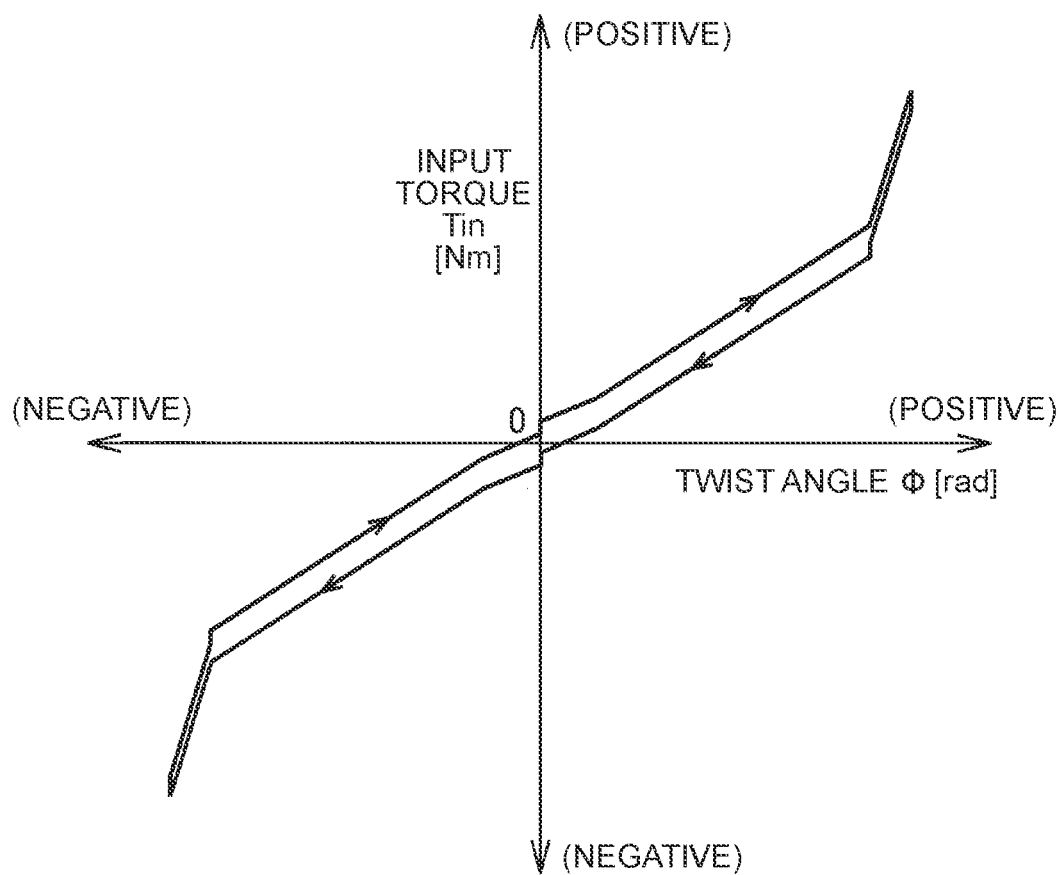
FIG. 3 is a view showing an exemplary relationship between an input torque Tin and a twist angle $\Phi$ of a damper device of FIG. 1.
Figure 4:
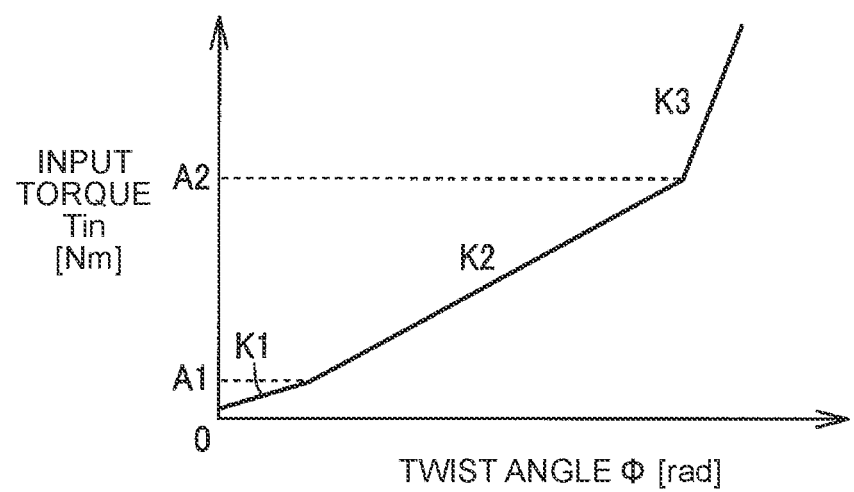
FIG. 4 is a view exemplifying the change characteristic of rigidity that are obtained from the relationship of FIG. 3.
Figure 5:
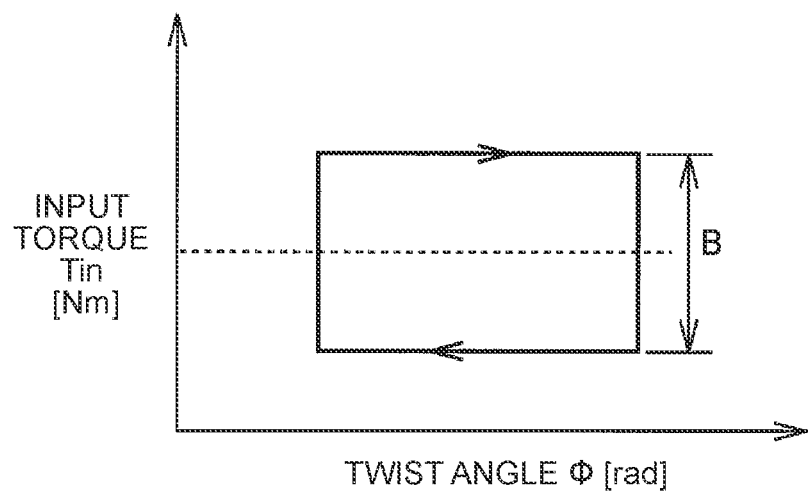
FIG. 5 is a view exemplifying a hysteresis B that is obtained from the relationship of FIG. 3.
Figure 6:
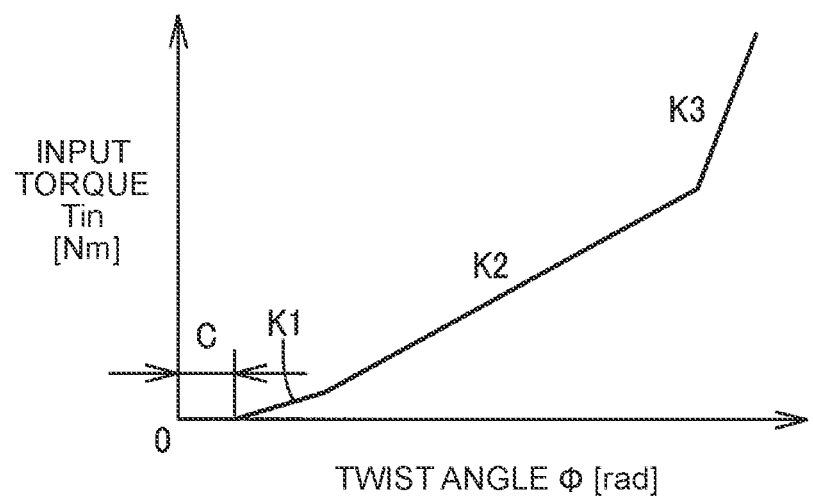
FIG. 6 is a view exemplifying a backlash dimension C that is obtained from the relationship of FIG. 3.

In the description of the present embodiment of the disclosure, as shown in FIG. 1, the control performed by the electronic control unit 90 will be described as a characteristic corresponding control unit 92, a characteristic storage unit 94, and a characteristic learning unit 96 for the sake of convenience. Predetermined control for improving power performance, vibration properties, noise properties and the like is performed based on the rigidity, hysteresis or backlash dimension as the characteristic of the damper device 26. The damper device 26 has a relationship between the input torque Tin and the twist angle Φ as shown in, for example, FIG. 3, due to the operation of the springs 32, the friction mechanisms 34 and the like. The input torque Tin and the twist angle Φ change symmetrically with respect to an origin 0 in FIG. 3. However, the damper device 26 in which the input torque Tin and the twist angle Φ change asymmetrically with respect to the origin 0 can also be adopted. Then, the characteristics regarding the rigidity shown in FIG. 4, the hysteresis shown in FIG. 5 and backlash dimension shown in FIG. 6 can be specified from this relationship between the input torque Tin and the twist angle Φ. The rigidity corresponds to the change (the gradient) in the twist angle Φ with respect to the change in the input torque Tin. Three rigidity values K1, K2 and K3 are shown in FIG. 4. The rigidity value changes at two change points A1 and A2 where the input torque Tin has different values. That is, the rigidity value is equal to K1 in a range where the input torque Tin is equal to or smaller than A1. The rigidity value is equal to K2 in a range where the input torque Tin is larger than A1 and equal to or smaller than A2. The rigidity value is equal to K3 in a range where the input torque Tin is larger than A2. The hysteresis in FIG. 5 is a deviation between the input torque Tin at the time when the twist angle Φ increases and the input torque Tin at the time when the twist angle Φ decreases. In FIG. 5, only the deviation is extracted and shown while the value corresponding to the rigidity is counterbalanced, and the hysteresis is represented by a dimension B. Besides, the backlash dimension in FIG. 6 is an amount of change in the twist angle Φ at the time when the sign of the input torque Tin is reversed, and is a play between the first rotary element 26a and the second rotary element 26b of the damper device 26. The backlash dimension is represented by a dimension C. At least one of these characteristics, namely, the rigidity values K1 to K3 and points A1 and A2 regarding rigidity, the hysteresis B, and the backlash dimension C is obtained in advance through an experiment, a simulation or the like, or is learned by the characteristic learning unit 96 before shipment or the like to be stored into the characteristic storage unit 94.

The characteristic corresponding control unit 92 performs predetermined control for improving power performance, vibration properties, noise properties and the like, based on at least one characteristic of the rigidity values K1 to K3 and the change points A1 and A2 regarding rigidity, the hysteresis B, and the backlash dimension C stored in the characteristic storage unit 94. For example, the control based on the characteristic regarding rigidity (K1 to K3, A1 and A2) will be described concretely. By stopping the engine 12 and engaging the mesh-type brake 36 to lock the crankshaft 24 (prevent the crankshaft 24 from rotating), the hybrid vehicle 10 can be caused to run forward through bilateral motor driving in which power running control of the first motor-generator MG1 is performed in the negative rotational direction and power running control of the second motor-generator MG2 is performed in the positive rotational direction. In this case, the reaction force of the power running torque of the first motor-generator MG1 is received by the damper device 26, so the vehicle may resonate due to the rigidity of the damper device 26. Therefore, the input torque Tin of the damper device 26 is calculated based on the power running torque of the first motor-generator MG1, the rigidity value of the damper device 26 (one of K1 to K3) is obtained from the characteristic regarding rigidity (K1 to K3, A1 and A2), and it is determined whether or not the vehicle may resonate. When the vehicle may resonate, the power running torque of the first motor-generator MG1 is changed such that the input torque range corresponds to different rigidity values, and the change is compensated for by the power running torque of the second motor-generator MG2. Moreover, even in the case where the vehicle runs using the engine 12 as a driving force source, the torque of the engine and the like can be controlled in consideration of the rigidity of the damper device 26. Besides, when the direction of the torque transmitted to the damper device 26 is reversed, namely, when the engine 12 is started or stopped, or when an engine brake is operated etc., the generation of vibrations, noise and the like can be suppressed by, for example, performing torque control of the first motor-generator MG1 based on the hysteresis B and backlash dimension C in FIGS. 5 and 6.

It should be noted herein that at least one of the various characteristics of the damper device 26 stored in advance in the characteristic storage unit 94, namely, the rigidity values K1 to K3 and the change points A1 and A2 regarding rigidity, the hysteresis B, and the backlash dimension C may vary due to the individual difference of the damper device 26, namely, the dimensional error of its components, the variation of the spring constant of the springs 32, the variation of the friction coefficient of friction materials of the friction mechanisms 34 and the like, and may change due to aging. Then, when these characteristics vary or change, a desired effect may not be obtained in spite of the performance of predetermined control by the characteristic corresponding control unit 92 based on the characteristic stored in advance in the characteristic storage unit 94. Therefore, in the present embodiment of the disclosure, the characteristic learning unit 96 is provided to learn the characteristic.

Figure 7:
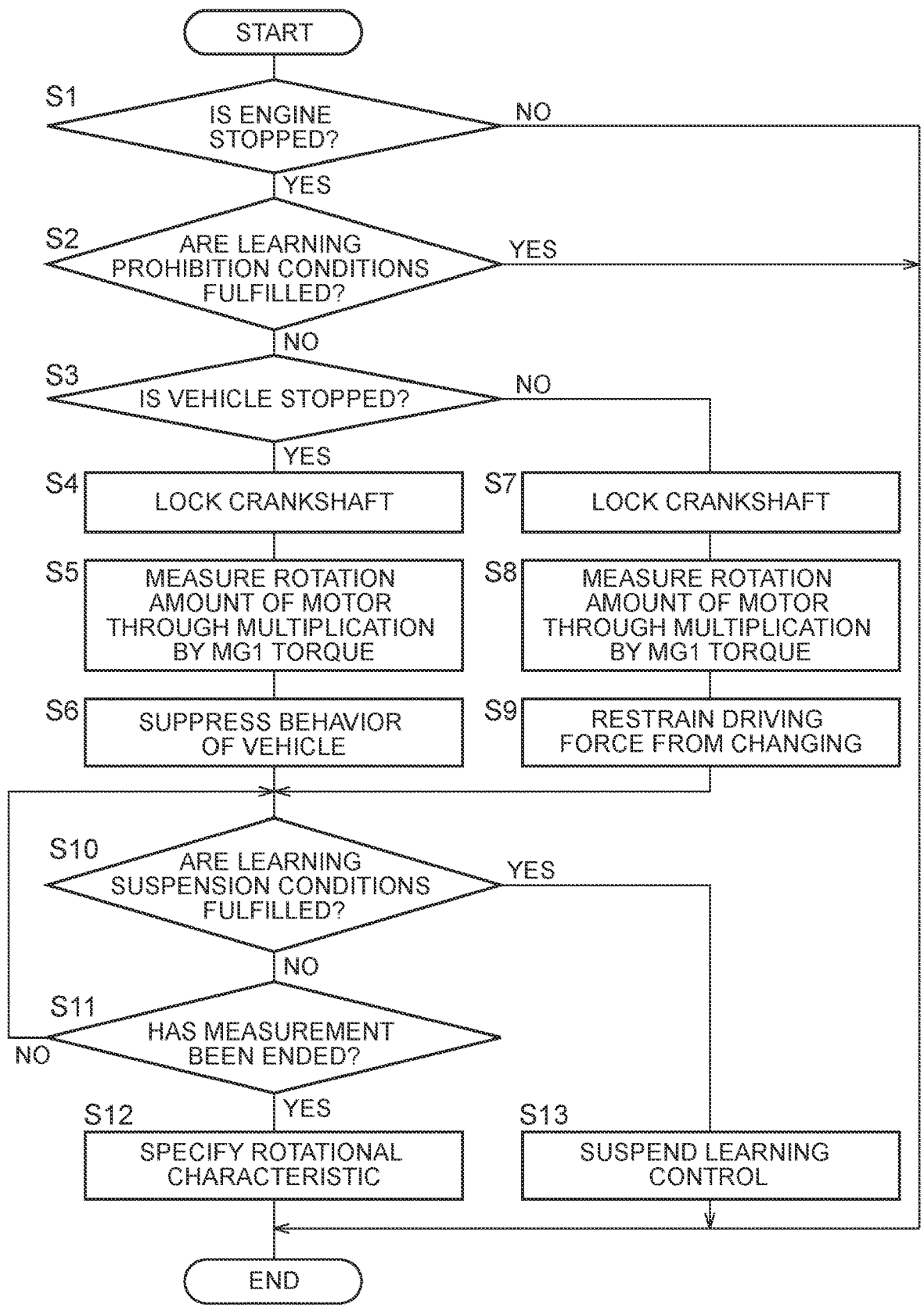
FIG. 7 is a flowchart concretely illustrating a signal process that is carried out by an electronic control unit of FIG. 1.

The characteristic learning unit 96 performs learning control according to steps S1 to S13 (hereinafter referred to simply as S1 to S13) of a flowchart of FIG. 7. This learning control is periodically performed by the electronic control unit 90 under a certain condition determined based on a running distance, a running time or the like. In S1, it is determined whether or not the engine 12 is stopped. If the engine 12 is stopped, S2 is carried out. If the engine 12 is in operation, the learning control is immediately ended. In S2, it is determined whether or not learning prohibition conditions determined in advance are fulfilled. These learning prohibition conditions are determined as indicated below by, for example, (a) and (b) and the like.

(a) The remaining electrical storage amount SOC of the electrical storage device 62 is equal to or smaller than a lower limit determined in advance for the securement or the like of the startability of the engine 12.

(b) There is a request for the start of the engine (a request to turn on an air-conditioner, operation of an accelerator by a driver, or the like).

Figure 8:
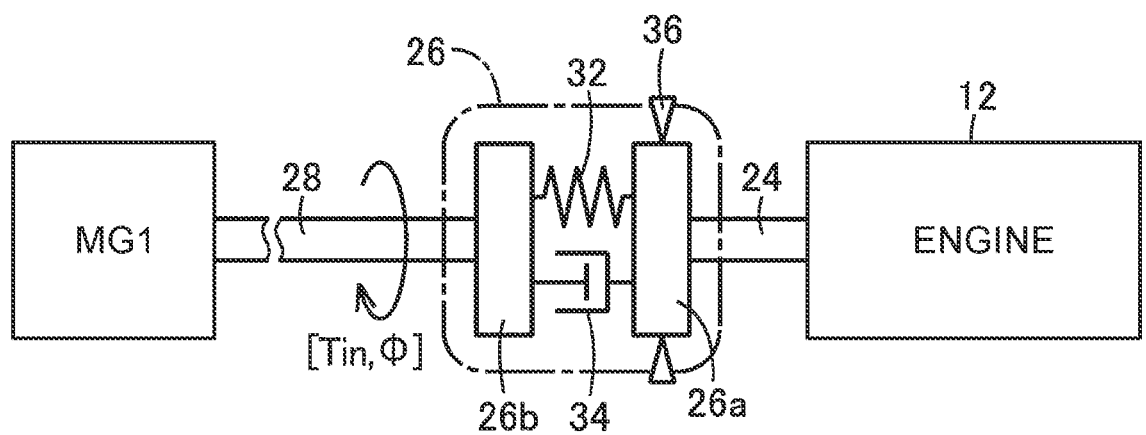
FIG. 8 is a principle view in measuring the twist angle $\Phi$ while changing the input torque Tin of the damper device in steps S4 and S5 of FIG. 7.

If at least one of the aforementioned learning prohibition conditions is fulfilled, the learning control is immediately ended. If none of the aforementioned learning prohibition conditions is fulfilled, learning is possible, so the steps starting from S3 are carried out. In S3, it is determined whether or not the hybrid vehicle 10 is stopped, namely, whether or not the vehicle speed V is equal to 0. If the hybrid vehicle 10 is stopped, the steps starting from S4 are carried out. In S4, the mesh-type brake 36 is engaged to unrotatably lock the crankshaft 24. In S5, power running control of the first motor-generator MG1 is performed to apply a torque (the input torque Tin) to the damper device 26 and measure the twist angle $\Phi$. FIG. 8 is a view illustrating the principle in applying the input torque Tin and measuring the twist angle $\Phi$ in this manner. Power running control of the first motor-generator MG1 is performed, and the torque (the input torque Tin) is applied to the damper device 26 via the differential mechanism 30, with the mesh-type brake 36 engaged to lock the crankshaft 24. Thus, a relationship as shown in FIG. 3 can be obtained. That is, a relationship between the input torque Tin and the twist angle $\Phi$ as shown in FIG. 3 can be obtained by measuring the MG1 rotational speed Nmg1 by the MG1 rotational speed sensor 74 such as a resolver or the like, while continuously changing the torque of the first motor-generator MG1 in an increasing/decreasing manner. The input torque Tin can be calculated from a motor torque of the first motor-generator MG1 based on the gear ratio $\rho$ of the differential mechanism 30, and the twist angle $\Phi$ can be calculated from the MG1 rotational speed Nmg1. The relationship between the input torque Tin of the damper device 26 and the twist angle $\Phi$ in the present embodiment of the disclosure symmetrically changes with respect to the origin 0 as shown in FIG. 3, so only one of the positive and negative sides may be measured. In the case where a one-way clutch is provided instead of the mesh-type brake 36 and the engine 12 is prevented from rotating only in the reverse rotational direction, the twist angle $\Phi$ may be measured while a torque in the reverse rotational direction is applied as the input torque Tin.

S6 is carried out in parallel with the aforementioned S5. In S6, the behavior of the vehicle is suppressed such that the vehicle is held stopped regardless of power running control of the first motor-generator MG1. That is, when power running control of the first motor-generator MG1 is performed to apply a torque to the damper device 26, the torque is transmitted to the output gear 40 due to a reaction force of the damper device 26, and a driving force is generated. Therefore, the behavior of the vehicle resulting from the driving force is restrained. In concrete terms, for example, when the parking range is selected and the parking lock pawl is urged in such a manner as to mesh with the parking gear 45, the parking lock pawl is reliably meshed with the parking gear 45 by performing power running control of the second motor-generator MG2 to slightly rotate the intermediate shaft 42. As another means, the wheel brakes 67 may be caused to generate braking forces by the automatic brake system 66. Besides, the mesh-type clutch 43 is released to suspend the transmission of power to the driving wheel 14 sides, and the torque of the second motor-generator MG2 is controlled to prevent the output gear 40 from rotating. Thus, the predetermined input torque Tin is applied to the damper device 26. In other words, the torque of the second motor-generator MG2 is controlled in such a manner as to counterbalance the driving force generated through power running control of the first motor-generator MG1. The torque control can be performed even when the mesh-type clutch 43 remains engaged. The torque control is also applicable to a vehicle that is not equipped with the mesh-type clutch 43. Incidentally, when the parking range is selected, the parking lock pawl is meshed with the parking gear 45 to prevent the driving wheels 14 from rotating, so it is also possible to omit the behavior suppression control of the vehicle in S6.

If the result of the determination in the foregoing S3 is NO (negative), namely, if the vehicle is running instead of being stopped, S7 to S9 are carried out to obtain a relationship between the input torque Tin and the twist angle $\Phi$. In concrete terms, in S7 and S8 as well as the foregoing S4 and S5, with the crankshaft 24 unrotatably locked by the mesh-type brake 36, power running control of the first motor-generator MG1 is performed to apply the torque (the input torque Tin) to the damper device 26 and measure the twist angle $\Phi$. In this case, the output gear 40 is rotated in accordance with the vehicle speed V as shown in FIG. 2, and moreover, the first motor-generator MG1 is rotated in the reverse rotational direction, so the twist angle $\Phi$ is calculated with the value corresponding to the rotational speed removed. Incidentally, in running through bilateral motor driving in which the first motor-generator MG1 is used as a driving force source, a changeover to single motor driving in which the vehicle runs using only the second motor-generator MG2 as a driving force source is temporarily made. Thus, the twist angle $\Phi$ can be measured by the MG1 rotational speed sensor 74 such as a resolver or the like, while continuously changing the torque of the first motor-generator MG1 in an increasing/decreasing manner. Besides, in S9, the driving force of the vehicle is restrained from changing by controlling the torque of the second motor-generator MG2 in an increasing/decreasing manner in such a manner as to counterbalance the driving force generated through power running control of the first motor-generator MG1. When the hybrid vehicle 10 coasts, the mesh-type clutch 43 may be released to suspend the transmission of power to the driving wheel 14 sides, and the torque of the second motor-generator MG2 may be controlled in such a manner as to counterbalance the driving force generated through power running control of the first motor-generator MG1. Even while running with a predetermined driving force, the torque of the second motor-generator MG2 may be controlled in such a manner as to counterbalance the driving force generated through power running control of the first motor-generator MG1, with the mesh-type clutch 43 released to suspend the transmission of power to the driving wheel 14 sides in the same manner.

In S10 that is carried out in succession to S6 or S9, it is determined whether or not learning suspension conditions determined in advance are fulfilled. These learning suspension conditions are determined as indicated below by, for example, (a) to (g) and the like.

(a) The remaining electrical storage amount SOC of the electrical storage device 62 is equal to or smaller than a lower limit determined in advance for the securement or the like of the startability of the engine 12.

(b) There is a request for the start of the engine (a request to turn on an air-conditioner, operation of an accelerator by a driver, or the like).

(c) There is a condition under which the vehicle resonates (tire input surge, a wavelike road, or the like).

(d) The driving force is insufficient (a slope, a curb, running with a large driving force, or the like).

(e) A motor torque needs to be generated due to another requirement (a motor pressing torque, the start of the engine, or the like).

(f) The vehicle is in a low rotation range (a low vehicle speed range) where the motor cogging torque is large.

(g) The vehicle moves at the time of a measurement with the vehicle stopped.

If at least one of the aforementioned learning suspension conditions is fulfilled, learning control is suspended and ended in S13. If none of the aforementioned learning suspension conditions is fulfilled, S11 is carried out. In S11, it is determined whether or not a series of measurements have been ended by carrying out S5 or S8. S10 is repeatedly carried out until the measurements are ended. If the measurements are ended without fulfilling the learning suspension conditions in S10, the result of the determination in S11 is YES (affirmative). Then, S12 is carried out to specify rotation characteristic of the damper device 26 and store (overwrite) the specified rotation characteristic into the characteristic storage unit 94. That is, the characteristic is stored into the characteristic storage unit 94 by extracting the rigidity values K1 to K3 and change points A1 and A2 shown in FIG. 4, extracting the hysteresis B shown in FIG. 5, or extracting the backlash dimension C shown in FIG. 6 from a relationship between the input torque Tin and the twist angle Φ as shown in FIG. 3, which has been obtained by carrying out S5 or S8. Thus, the characteristic corresponding control unit 92 performs the following control based on the new characteristic stored in the characteristic storage unit 94.

As described hitherto, in the hybrid vehicle 10 according to the present embodiment of the disclosure, the characteristic such as rigidity and the like are learned by applying the torque Tin to the damper device 26 through power running control of the first motor-generator MG1 and measuring the twist angle Φ, and predetermined control is performed based on the learned characteristic, with rotation of the crankshaft 24 locked by the mesh-type brake 36. Therefore, predetermined control is appropriately performed based on the actual characteristic, regardless of the variation of the characteristic resulting from the individual difference of the damper device 26 or the like, or aging. That is, when the vehicle runs with a torque applied to the damper device 26, when the engine 12 is started, or when an engine brake is operated etc., the rigidity values K1 to K3 and the change points A1 and A2, the hysteresis B or the backlash dimension C as the characteristic of the damper device 26 may influence power performance, vibration properties, noise properties and the like. However, the control for improving power performance, vibration properties, noise properties and the like can be performed based on those characteristic, by the characteristic corresponding control unit 92. In this case, the characteristics are learned by the characteristic learning unit 96, so the control thereof is appropriately performed based on actual characteristic regardless of the variation of the characteristic resulting from the individual difference or the like of the damper device 26, or aging.

Besides, the torque of the second motor-generator MG2 is controlled in such a manner as to counterbalance the driving force generated in applying the torque to the damper device 26, by the first motor-generator MG1, so as to learn the characteristic of the damper device 26. Therefore, the characteristic of the damper device 26 can be learned while restraining a passenger from developing a feeling of strangeness due to fluctuations in the driving force.

Besides, when the torque of the first motor-generator MG1 is controlled based on the characteristic regarding the rigidity (K1 to K3, A1, and A2) of the damper device 26 such that the vehicle is restrained from resonating as a result of the rigidity of the damper device 26, at the time of bilateral motor driving in which the vehicle runs using the first motor-generator MG1 and the second motor-generator MG2 as driving force sources, with rotation of the crankshaft 24 locked by the mesh-type brake 36, the characteristic is learned by the characteristic learning unit 96. Thus, the torque of the first motor-generator MG1 is controlled based on the accurate characteristic regardless of the individual difference of the damper device 26 or aging, and the vehicle can be appropriately restrained from resonating.

Although the embodiment of the disclosure has been described above in detail based on the drawings, the foregoing description is nothing but the embodiment of the disclosure. The disclosure can be carried out in an aspect subjected to various alterations and improvements, based on the knowledge of those skilled in the art.

What is claimed is:

1. A control apparatus for a vehicle,
the vehicle including an engine, a first electric motor, a rotary member, and a rotation lock mechanism, the rotary member being provided between the engine and the first electric motor, the rotary member having characteristic associated with an input torque, and the rotation lock mechanism being configured to prevent a coupling portion of the rotary member on an engine side from rotating in at least one direction,
the control apparatus comprising:
an electronic control unit configured to learn characteristic of the rotary member by applying a torque to the rotary member by the first electric motor and measuring a twist angle of the rotary member, with the rotation lock mechanism preventing the coupling portion from rotating; and
the electronic control unit being configured to perform predetermined control based on the learned characteristic of the rotary member.

2. The control apparatus according to claim 1, wherein
the vehicle further includes a second electric motor that is configured to be utilized as a driving force source,
a driving force of the vehicle is generated due to a reaction force resulting from the rotation lock mechanism, when the first electric motor applies the torque to the rotary member, with the rotation lock mechanism preventing the coupling portion from rotating, and
the electronic control unit is configured to control a torque of the second electric motor in such a manner as to counterbalance the driving force that is generated by the reaction force, when the torque is applied to the rotary member by the first electric motor to learn the characteristic.

3. The control apparatus according to claim 1, wherein the rotary member is a damper device.

4. The control apparatus according to claim 1, wherein
the vehicle further includes a driving wheel and a differential mechanism,
the differential mechanism is configured to distribute an output of the engine to a first electric motor side and a driving wheel side, the rotary member is a damper device, the damper device is provided between the engine and the differential mechanism, and when the torque is applied to the damper device via the differential mechanism by the first electric motor with the rotation lock mechanism preventing the coupling portion from rotating, the reaction force resulting from the rotation lock mechanism is transmitted to the driving wheel side via the differential mechanism, and the electronic control unit is configured to use the first electric motor as a driving force source.

5. The control apparatus according to claim 4, wherein the characteristic is a characteristic regarding a rigidity corresponding to a change in the twist angle with respect to a change in the input torque of the damper device, the characteristic is equipped with a plurality of input torque ranges with different rigidity values, and the electronic control unit is configured to control a torque of the first electric motor such that a rigidity value at which the vehicle is restrained from resonating is obtained, based on a relationship between the rigidity values and the input torque, when the vehicle runs using the first electric motor as a driving force source, with the coupling portion prevented from rotating by the rotation lock mechanism.

6. A control method for a vehicle, the vehicle includes an engine, a first electric motor, a rotary member, a rotation lock mechanism, and an electronic control unit, the rotary member being provided between the engine and the first electric motor, the rotary member having characteristic associated with an input torque, and the rotation lock mechanism being configured to prevent a coupling portion of the rotary member on an engine side from rotating in at least one direction, the control method comprising:

learning, by the electronic control unit, the characteristic of the rotary member by applying a torque to the rotary member by the first electric motor and thus measuring a twist angle of the rotary member by the electronic control unit, with the rotation lock mechanism preventing the coupling portion from rotating; and performing, by the electronic control unit, predetermined control based on the learned characteristic of the rotary member.

* * * * *